United States Patent [19]

Kishida et al.

[11] Patent Number: 5,043,386
[45] Date of Patent: Aug. 27, 1991

[54] POLYVINYL CHLORIDERESIN COMPOSITION

[75] Inventors: Kazuo Kishida, Tokyo, Japan; Kiyokazu Kitai, Westfield, N.J.; Kenji Ohkage, Yokohama, Japan

[73] Assignee: Mitsubishi Rayon Company Ltd., Tokyo, Japan

[21] Appl. No.: 365,722

[22] Filed: Jun. 14, 1989

[30] Foreign Application Priority Data

Jun. 14, 1988 [JP] Japan ................................ 63-144695

[51] Int. Cl.$^5$ .............................................. C08L 51/04
[52] U.S. Cl. ...................................... 525/84; 525/310
[58] Field of Search .................................. 525/84, 310

[56] References Cited

U.S. PATENT DOCUMENTS 4,362,845 12/1982 Kamata et al. .

FOREIGN PATENT DOCUMENTS 2239488 7/1973 France .

Primary Examiner—Jacob Ziebler
Attorney, Agent, or Firm—Oblon, Spivak, McClelland, Maier & Neustadt

[57] ABSTRACT

Disclosed is a modifier to be incorporated in a polyvinyl chloride resin, which is a graft copolymer obtained by carrying out, in the presence of 100 parts by weight of a butadiene rubber having a swelling degree of 10 to 50 and an average particle diameter of 0.1 to 0.4 μm, first-stage graft polymerization of 1 of 42 parts by weight of methyl methacrylate and 0 to 5 parts by weight of an alkyl acrylate, second-stage graft polymerziation of 10 to 120 parts by weight of styrene and third-stage graft polymerization of 7 to 75 parts by weight to methyl methacrylate and 0 to 20 parts by weight of an alkyl acrylate, the content of the butadiene rubber in the graft copolymer being 35 to 75% by weight. The polyvinyl chloride resin composition having this modifier incorporated therein provides a molded article having excellent impact resistance, solvent resistance, and transparency.

7 Claims, No Drawings

POLYVINYL CHLORIDERESIN COMPOSITION

BACKGROUND OF THE INVENTION (1) Field of the Invention

The present invention relates to a polyvinyl chloride resin composition which gives a molded article having an excellent impact resistance, solvent resistance and transparency.

(2) Description of the Related Art

Since a polyvinyl chloride resin is cheap and has various excellent chemical and physical properties, this resin is manufactured in large quantities than other synthetic resins and is widely used in various fields. Nevertheless, as is well-known, a molded article composed solely of a polyvinyl chloride resin has a problem in that the molded article is brittle under impact, and accordingly, many improvements have heretofore been proposed for overcoming this problem.

As the most effective process for modifying a polyvinyl chloride resin, a process is known in which a graft polymer obtained by graft-polymerizing a monomer such as styrene, acrylonitrile or methyl methacrylate onto a rubbery elastomer is incorporated in a polyvinyl chloride resin (see, for example, U.S. Pat. Nos. 4,362,845, 4,607,080 and 4,624,987, and Japanese Unexamined Patent Publication No. 58-152039). The graft copolymer obtained by the above process has already been marketed as an impact resistance-improving material for a polyvinyl chloride resin and has made a great contribution to a widening of the applications of a polyvinyl chloride resin product.

Nevertheless, the impact resistance is still unsatisfactory in some applications, and a further improvement thereof is desired.

In general, the impact resistance and solvent resistance can be improved by increasing the size of rubber particles in the polymer as the modifier. In this case, however, the problem of a reduction of the transparency arises.

As apparent from the foregoing description, a polyvinyl chloride resin composition having a satisfactory impact resistance, solvent resistance, and transparency has not been developed.

SUMMARY OF THE INVENTION

Therefore, the primary object of the present invention is to provide a polyvinyl chloride resin composition capable of giving a molded article having an excellent impact resistance, solvent resistance, and transparency.

In accordance with the present invention, there is provided a polyvinyl chloride resin composition comprising (A) 3 to 40 parts by weight of a graft copolymer obtained by carrying out, in the presence of 100 parts by weight of a butadiene rubber having a swelling degree of 10 to 50 and an average particle diameter of 0.1 to 0.4 $\mu$m, first-stage graft polymerization of 1 to 42 parts by weight of methyl methacrylate and 0 to 5 parts by weight of an alkyl acrylate, second-stage graft polymerization of 10 to 120 parts by weight of styrene, and third-stage graft polymerization of 7 to 75 parts by weight of methyl methacrylate and 0 to 20 parts by weight of an alkyl acrylate, the content of the butadiene rubber in the graft copolymer being 35 to 75% by weight, and (B) 97 to 60 parts by weight of a polyvinyl chloride resin.

DESCRIPTION OF THE PREFERRED EMBODIMENTS

The graft copolymer as the component (A) comprises a butadiene rubber as the backbone polymer and predetermined monomers graft-polymerized thereon.

The butadiene rubber is a copolymer comprising at least 50% by weight, preferably at least 60% by weight, of 1,3-butadiene units. If the content of 1,3-butadiene units is lower than 50% by weight, the impact resistance of the molded article of the polyvinyl chloride resin composition is poor.

As the monomer copolymerizable with 1,3-butadiene, there can be mentioned mono-olefinic monomers such as acrylonitrile, styrene, an acrylic acid ester and a methacrylic acid ester, and polyfunctional monomers such as divinylbenzene, ethylene glycol dimethacrylate and 1,3-butylene glycol dimethacrylate.

The butadiene rubber has a swelling degree of 10 to 50, preferably 20 to 40. The swelling degree referred to herein is defined by the ratio $W_1/W_2$ in which $W_1$ stands for the weight of the rubber latex after a certain amount of the rubber latex in the absolutely dry state has been immersed in toluene in an amount 200 times the amount of the rubber latex and allowed to stand at 30° C. for 48 hours, and $W_2$ stands for the weight of the rubber latex in the absolutely dry state. If this swelling degree is lower than 10, the impact resistance and solvent resistance of the molded article are unsatisfactory, and if the swelling degree exceeds 50, the graft copolymer constituting the composition tends to agglomerate and the appearance of the molded article, such as the surface gloss, becomes poor.

The average particle diameter of the butadiene rubber is 0.1 to 0.4 $\mu$m, preferably 0.15 to 0.3 $\mu$m. If the average particle diameter is smaller than 0.1 $\mu$m, the impact resistance and solvent resistance of the molded article are degraded, and if the particle diameter exceeds 0.4 $\mu$m, the transparency of the molded article is degraded.

The butadiene rubber can be prepared in the presence of a catalyst such as a polymerization initiator by a known polymerization process such as an emulsion polymerization process.

After the polymerization, to adjust the particle diameter of the butadiene rubber, an agglomerating treatment using an electrolyte, an acid or a carboxyl group-containing polymer latex can be carried out. This agglomerating treatment can be conducted by placing the butadiene rubber in contact with the electrolyte or the like in a reaction vessel.

As the electrolyte, there can be mentioned inorganic electrolytes such as sodium chloride, sodium sulfate, potassium chloride, magnesium chloride, magnesium sulfate and calcium chloride, and polymeric electrolytes such as polyacrylamide, polyacrylic acid, polyvinyl alcohol, and polyvinyl pyrrolidone.

As the acid, there can be mentioned inorganic acids such as hydrochloric acid, nitric acid and sulfuric acid, and organic acids such as acetic acid, citric acid, succinic acid, and itaconic acid.

As the carboxyl group-containing polymer latex, there can be mentioned latices obtained by an emulsion copolymerization of combinations of monomers, such as a combination of n-butyl acrylate and methacrylic acid, a combination of ethyl acrylate and methacrylic acid, and a combination of n-butyl acrylate and acrylic acid.

The graft copolymer can be obtained by a three-stage graft polymerization using the above-mentioned butadiene rubber and predetermined monomers.

The first-stage graft polymerization is carried out by graft-polymerizing predetermined amounts of methyl methacrylate and alkyl acrylate onto the butadiene rubber.

The amount of methyl methacrylate used in the first stage is 1 to 42 parts by weight, preferably 6 to 34 parts by weight, per 100 parts by weight of the butadiene rubber. If the amount of methyl methacrylate is outside the above range, the impact resistance of the molded article is unsatisfactory.

The amount of the alkyl acrylate optionally used in the first stage is 0 to 5 parts by weight, preferably 0.5 to 4 parts by weight, per 100 parts by weight of the butadiene rubber. If the amount of the alkyl acrylate exceeds 5 parts by weight, the compatibility with the polyvinyl chloride resin is reduced and the surface condition of the molded article becomes poor.

Preferably, the amount of the alkyl acrylate is smaller than the amount of methyl methacrylate within the above-mentioned ranges. Namely, the amount of the alkyl acrylate is preferably 5 to 40% by weight based on the total amount of the two monomers.

Alkyl acrylates having 1 to 8 carbon atoms in the alkyl group are used as the alkyl acrylate. For example, there can be mentioned methyl acrylate, ethyl acrylate, propyl acrylate, n-butyl acrylate, iso-butyl acrylate, tert-butyl acrylate, 2-ethylhexyl acrylate and n-octyl acrylate. In view of the desired improvement of the flowability of the graft polymer and the prevention of a formation of ungelled products, ethyl acrylate and n-butyl acrylate are preferably used from among these alkyl acrylates.

The second-stage graft polymerization is carried out by using a predetermined amount of styrene.

The amount of styrene is 10 to 120 parts by weight, preferably 16 to 93 parts by weight per 100 parts by weight of the butadiene rubber. If the amount of styrene is outside the above range, the transparency of the molded article is unsatisfactory.

The third-stage graft polymerization is carried out by using methyl methacrylate and an optional alkyl acrylate having 1 to 8 carbon atoms in the alkyl group, in predetermined amounts to the butadiene rubber.

The amount of methyl methacrylate is 7 to 75 parts by weight, preferably 8 to 50 parts by weight, per 100 parts by weight of the butadiene rubber. If the amount of methyl methacrylate is outside this range, the impact resistance of the molded article is unsatisfactory.

The amount of the alkyl acrylate is 0 to 20 parts by weight, preferably 1 to 12 parts by weight, per 100 parts by weight of the butadiene rubber. If the amount of the alkyl acrylate exceeds 20 parts by weight, the compatibility with the polyvinyl chloride resin is reduced and the surface condition of the molded article becomes poor.

In the third-stage graft polymerization, in view of the desired compatibility with the polyvinyl chloride resin, preferably the amount of methyl methacrylate is larger than the amount of the alkyl acrylate. Namely, the amount of the alkyl acrylate is preferably 5 to 20% by weight based on the total amount of the two monomers.

In these first-stage, second-stage and third-stage graft polymerizations, a polymerization initiator, a reducing agent, a polymerization degree regulator, and an emulsifier can be used.

As the polymerization initiator, there can be mentioned potassium persulfate, ammonium persulfate, hydrogen peroxide, cumene hydroperoxide, p-menthane hydroperoxide, and di-isopropylbenzene hydroperoxide. A redox type initiator also can be used.

As the reducing agent, there can be mentioned Rongalit (formaldehyde sodium sulfoxylate dihydrate) and acidic sodium sulfite.

As the emulsifier, there can be mentioned anionic surface active agents such as fatty acid salts, alkyl sulfates, alkyl sulfonates and alkylaryl sulfonates, and nonionic surface active agents such as glyceryl monoalkylates and polyethylene glycol alkyl ethers.

The graft copolymer can be prepared by adding an appropriate antioxidant and other additives to the butadiene rubber latex obtained by the graft polymerization, coagulating the latex with an inorganic electrolyte, passing the product through the heat treatment, dehydration and washing steps, and drying the product.

In the obtained graft copolymer, the content of the butadiene rubber is 35 to 75% by weight. If the content of the butadiene rubber is smaller than 35% by weight, the impact strength of the molded article is unsatisfactory, and if the content of the butadiene rubber exceeds 75% by weight, the surface characteristics of the molded article become poor.

The polyvinyl chloride resin used as the component (B) in the present invention is polyvinyl chloride or a copolymer comprising at least 70% by weight of vinyl chloride and up to 30% by weight of a copolymerizable monomer such as vinyl bromide, vinylidene chloride, vinyl acetate, acrylic acid, methacrylic acid or ethylene. A polyvinyl chloride resin having an average polymerization degree of 500 to 1,500 is preferably used.

The mixing ratio of the components (A) and (B) is such that the amount of the component (A) is 3 to 40 parts by weight and the amount of the component (B) is 97 to 60 parts by weight. If the amount of the component (A) is smaller than 3 parts by weight, a substantial effect cannot be obtained by the addition of the component (A), and if the amount of the component (A) exceeds 40 parts by weight, the excellent characteristics inherently possessed by polyvinyl chloride are not manifested and the composition is not preferable from the economical viewpoint. Preferably the mixing ratio is such that the amount of the component (A) is 5 to 20 parts by weight and the amount of the component (B) is 95 to 80 parts by weight.

Known stabilizers, plasticizers, molding assistants, and colorants can be incorporated into the composition of the present invention according to need.

The composition of the present invention can be prepared by mixing the graft copolymer and the polyvinyl chloride resin, optionally together with other additives, by a ribbon blender or a Henschel mixer. The composition can be molded by a known kneader such as a mixing roll, a Banbury mixer or an extruder.

The present invention will now be described in detail with reference to the following examples that by no means limit the scope of the invention. All of "parts" in the examples are by weight.

EXAMPLE 1

The components described below were subjected to polymerization at 50° C. for 8 hours in a pressure-resistant autoclave, to prepare a butadiene rubber latex (latex a). The average particle diameter of the obtained rubber was 0.09 μm, and the swelling degree of the rubber was 30.

| | |
|---|---|
| 1,3-Butadiene | 75 parts |
| Styrene | 25 parts |
| tert-Dodecylmercaptan | 0.5 part |
| Di-iso-propylbenzene hydroperoxide | 0.2 part |
| Sodium pyrophosphate | 0.5 part |
| Ferrous sulfate | 0.01 part |
| Dextrose | 1.0 part |
| Potassium oleate | 2.0 parts |
| Water | 200 parts |

The obtained rubber was subjected to the agglomerating treatment. For this agglomerating treatment, a latex (latex b) having a pH value of 6.2, which was obtained by polymerizing components described below at 70° C. for 4 hours, was used.

| | |
|---|---|
| Ethyl acrylate | 90 parts |
| Methacrylic acid | 10 parts |
| Potassium persulfate | 0.5 part |
| Nonsal TK-1 (sodium soap of semi-hardened beef-tallow fatty acid supplied by Nippon Oil and Fats) | 2.0 parts |
| Lapisol 80 (sodium octylsulfosuccinate supplied by Nippon Oil and Fats) | 1.0 part |

PREPARATION OF AGGLOMERATED LATEX

A reaction vessel equipped with a stirrer was charged with 100 parts (as solids) of the latex a, and 0.5 part (as solids) of the latex b was added while stirring over a period of 10 minutes. After stirring was conducted for further 3 minutes, a part of the latex was sampled and subjected to the osmium tetroxide treatment under an electron microscope to measure the particle diameter. It was found that the particle diameter was changed to 0.2 to 0.6 μm and the number average particle diameter was 0.3 μm. When the latex was filtered through a 200-mesh metal net, it was found that no undesirable large aggregates were formed.

PREPARATION OF POLYVINYL CHLORIDE RESIN COMPOSITION

A graft copolymer was prepared by using the following components.

| | |
|---|---|
| Agglomerated latex | 65 parts |
| Styrene | 15 parts |
| Methyl methacrylate | 17 parts |
| Ethyl acrylate | 3 parts |
| Potassium oleate | 1.2 parts |
| Cumene hydroperoxide | 0.6 part |
| Rongalit | 0.5 part |
| Water (as a whole) | 200 parts |

Of the foregoing components, the agglomerated latex, Rongalit, and water were charged in a flask in which the inner atmosphere had been replaced by nitrogen. The following three stages of the graft polymerization were carried out while maintaining the inner temperature at 70° C. At the first stage, a mixture comprising 6 parts of methyl methacrylate, 1 part of ethyl acrylate and 0.1 part of cumene hydroperoxide was dropped into the flask over a period of 20 minutes, and the reaction mixture was allowed to stand for 1 hour. At the second stage, a mixture comprising 15 parts of styrene and 0.3 part of cumene hydroperoxide was continuously dropped into the flask over a period of 1 hour and the reaction mixture was allowed to stand for 2 hours. At the third stage, a mixture comprising 11 parts of methyl methacrylate, 2 parts of ethyl acrylate, and 0.2 part of cumene hydroperoxide was added dropwise over a period of 50 minutes and the reaction mixture was allowed to stand for 1 hour to complete the polymerization. Then 0.5 part of butylated hydroxytoluene was added to the obtained latex, and the latex was coagulated by an addition of a 0.2% aqueous solution of sulfuric acid. The coagulated product was washed with warm water and dried to obtain a graft copolymer.

Then 10 parts of the graft copolymer, 100 parts of a polyvinyl chloride resin, and 3 parts of dioctyltin mercaptide, 2 parts of epoxidized soybean oil, 1 part of Metablene ® P-550 (supplied by Mitsubishi Rayon), 1 part of Rikemal S-100 (supplied by Riken Vitamin), and 0.4 part of Wax-OP (supplied by Hoechst) as the stabilizer and lubricant were mixed for 10 minutes by a Henschel mixer until the temperature rose to 110° C., whereby the composition of the present invention was obtained.

A molded article prepared from the composition was subjected to the following tests.

BALL FALLING STRENGTH TEST

The composition was formed into a bottle having a capacity of 300 ml by a blow forming machine having a screw diameter of 50 mm. The bottle was filled with cold water maintained at 4° C., and the bottle was allowed to drop from a certain height. The bottle strength was evaluated based on the drop height from which 50% of the tested samples were broken.

IZOD IMPACT STRENGTH

The composition was roll-kneaded at 180° C. for 3 minutes to obtain a sheet. The sheet was pressed at 190° C. under a pressure of 50 kg/cm$^2$ for 5 minutes, a test piece of 63.5 mm × 12.7 mm × 12.7 mm was cut from the sheet, and the initial Izod impact strength was measured according to ASTM D256-56.

SOLVENT RESISTANCE

Ten Izod impact test pieces described above were used. One end of the test piece having a notch portion impregnated with pine oil, olive oil or the like was fixed and a load of 2 kg was continuously applied to the other end, and after the lapse of a certain time, the Izod impact strength was measured according to ASTM D256-56. The solvent resistance was evaluated based on the number of test pieces in which a brittle fracture occurred.

EXAMPLES 2 AND 3 AND COMPARATIVE EXAMPLES 1 AND 2

Compositions were prepared in the same manner as described in Example 1 except that the amount of tert-dodecylmercaptan used for the butadiene rubber latex was changed as shown in Table 1, to change the swelling degree of the rubber as shown in Table 1. The obtained compositions were tested in the same manner as described in Example 1, and the results are shown in Table 1.

TABLE 1

| | Swelling degree | Bottle falling strength (50% broken height) (cm) | Initial Izod impact strength (kg·cm/cm²) | Number of test pieces wherein brittle fracture occurred | Appearance of bottle |
| --- | --- | --- | --- | --- | --- |
| Example 1 | 30 | 180 | 95 | 0 | Good |
| Example 2 | 15 | 120 | 90 | 3 | Good |
| Example 3 | 45 | 150 | 50 | 5 | Good |
| Comparative Example 1 | 8 | 80 | 100 | 9 | Good |
| Comparative Example 2 | 60 | 100 | 10 | 7 | Poor |

As apparent from the results shown in Table 1, if the swelling degree of the rubber is lower than 10, the bottle falling strength is reduced, and although the initial Izod impact strength is high, in substantially all of the test pieces, a brittle fracture occurs after immersion in oil and the strength is drastically reduced, i.e., the solvent resistance is lowered. If the swelling degree of the rubber exceeds 50, the bottle strength is reduced and the initial Izod strength already corresponds to the brittle fracture, and the bottle appearance becomes poor.

In contrast, as apparent from the results obtained in Examples 1 through 3, by controlling the swelling degree of the rubber to 10 to 50, a high bottle falling strength, a high initial Izod strength and a high solvent resistance can be obtained.

EXAMPLES 4 THROUGH 6 AND COMPARATIVE EXAMPLES 3 THROUGH 5

To 65 parts of the butadiene rubber obtained in Example 1 was added 0.5 part (as solids) of the latex b while stirring over a period of 10 seconds, and 0.5 part of Rogalit was further added as the reducing agent. Then the first-stage graft polymerization, the second-stage graft polymerization and the third-stage graft polymerization were carried out. The compositions were the same as described in Example 1 except that the total amount of the monomers used was changed to 35 parts and the amounts of the respective monomers used were changed as shown in Table 2 (each value in Table 2 indicates the ratio to the solids in the agglomerated latex). The compositions were subjected to the same tests as described in Example 1.

Furthermore, each of the compositions was roll-kneaded and heat-pressed to form a test piece, and the haze value was measured according to ASTM D1003-61. The results are shown in Table 2. In Table 2, MMA represents methyl methacrylate and EA represents ethyl acrylate.

TABLE 2

| | Monomer composition (%) | | | Haze value (%) | Bottle appearance (ungelled product) |
| --- | --- | --- | --- | --- | --- |
| | First stage MMA/EA | Second stage styrene | Third stage MMA/EA | | |
| Example 4 | 21.5/2.5 | 50 | 23.5/2.5 | 20 | Good |
| Example 5 | 18/2 | 50 | 27/3 | 17 | Good |
| Example 6 | 9/1 | 50 | 36/4 | 15 | Good |
| Comparative Example 3 | 40/3 | 50 | 5/2 | 27 | Good |
| Comparative Example 4 | 27/3 | 50 | 18/2 | 24 | Good |
| Comparative Example 5 | 3/1 | 50 | 42/4 | 12 | Poor |

EXAMPLES 7 AND 8 AND COMPARATIVE EXAMPLES 6 AND 7

An agglomerated latex was prepared in the same manner as described in Example 1 except that the amount of the latex b added to 65 parts of the butadiene rubber of Example 1 was changed as shown in Table 3.

Graft copolymers and resin compositions were prepared in the same manner as described in Example 1 by using 65 parts (as solids) of the agglomerated latex. The compositions were tested in the same manner as described in Examples 4 through 6, and the results are shown in Table 3.

TABLE 3

| | Amount of added latex b (parts) | Average particle diameter (μm) | Bottle falling strength (50% broken height) (cm) | Number of test pieces wherein brittle fracture occurred | Haze value (%) |
| --- | --- | --- | --- | --- | --- |
| Example 7 | 0.5 | 0.18 | 150 | 2 | 15 |
| Example 8 | 1.0 | 0.28 | 220 | 0 | 24 |
| Comparative Example 6 | 0 | 0.08 | 50 | 10 | 8 |
| Comparative Example 7 | 5.0 | 0.55 | Higher than 300 | 0 | 35 |

As apparent from the results shown in Table 3, in Comparative Examples 6 and 7 where the average particle diameter of the butadiene rubber used was outside the range specified in the present invention, the bottle strength, solvent resistance and transparency were very bad.

EXAMPLES 9 AND 10 AND COMPARATIVE EXAMPLES 8 AND 9

Compositions were prepared in the same manner as described in Example 1 except that the amount (solids) of the agglomerated latex used was changed as shown in Table 4 and the amounts of the monomers used at the respective stages of the graft polymerization were changed as described below. The compositions were tested in the same manner as described in Example 1, and the results are shown in Table 4.

At the first stage, methyl methacrylate and ethyl acrylate were used in amounts of 18% by weight and 2% by weight, respectively, based on the solids in the agglomerated latex; at the second stage, styrene was used in an amount of 50% by weight based on the solids of the agglomerated latex; and at the third stage, methyl methacrylate and ethyl acrylate were used in amounts of 27% by weight and 3% by weight, respectively, based on the solids of the agglomerated latex.

TABLE 4

| | Butadiene rubber content (weight %) | Bottle falling strength (50% broken height) (cm) | Number of test pieces wherein brittle fracture occurred | Appearance of bottle |
|---|---|---|---|---|
| Example 9 | 50 | 120 | 5 | Good |
| Example 10 | 65 | 200 | 0 | Good |
| Comparative Example 8 | 30 | 40 | 10 | Good |
| Comparative Example 9 | 80 | 250 | 0 | Good |

As apparent from the results shown in Table 4, if the butadiene rubber content is lower than 35% by weight, the bottle falling strength and solvent resistance are poor, and if the butadiene rubber content exceeds 75% by weight, the bottle appearance is poor.

EXAMPLES 11 THROUGH 13 AND COMPARATIVE EXAMPLES 10 AND 11

Compositions were prepared in the same manner as described in Example 1 except that the graft copolymer of Example 10 was used and the mixing ratio of the graft copolymer to the polyvinyl chloride resin was changed as shown in Table 5. The compositions were tested in the same manner as described in Example 1, and the results are shown in Table 5.

TABLE 5

| | Polyvinyl chloride/graft copolymer ratios | Ball falling strength (50% broken height) (cm) | Appearance of bottle |
|---|---|---|---|
| Example 11 | 98/5 | 110 | Good |
| Example 12 | 90/10 | 180 | Good |
| Example 13 | 80/20 | 220 | Good |
| Comparative Example 10 | 99/1 | 15 | Fair |
| Comparative Example 11 | 50/50 | 130 | Poor |

As apparent from the results shown in Table 5, if the amount incorporated of the graft copolymer is smaller than 3 parts, the impact resistance is lowered, and if the amount of the graft copolymer exceeds 40 parts, the appearance is poor and the impact resistance is lowered.

We claim:

1. A polyvinyl chloride resin composition comprising:
   (A) 3 to 40 parts by weight of a graft copolymer obtained by carrying out, in the presence of 100 parts by weight of a butadiene rubber having a swelling degree of 10 to 50 and an average particles diameter of 0.15 to 0.4 μm, first-stage graft polymerization of 6 to 42 parts by weight of methyl methacrylate and 0 to 5 parts by weight of an alkyl acrylate, second-stage graft polymerization of 10 to 120 parts by weight of styrene and third-stage graft polymerization of 7 to 75 parts by weight of methyl methacrylate and 0 to 20 parts by weight of an alkyl acrylate, the content of the butadiene rubber in the graft copolymer being 35 to 75% by weight, the total amount of methyl methacrylate and the alkyl acrylate employed in the third-stage graft polymerization being larger than the total amount of methyl methacrylate and the alkyl acrylate employed in the first-stage graft polymerization, and
   (B) 97 to 60 parts by weight of a polyvinyl chloride resin.

2. A polyvinyl chloride resin composition according to claim 1, wherein the butadiene rubber comprises at least 50% by weight of units derived from 1,3-butadiene and not more than 50% by weight of at least one monoolefinic monomer or polyfunctional monomer.

3. A polyvinyl chloride resin composition according to claim 1, wherein the butadiene rubber has a swelling degree of 20 to 40.

4. A polyvinyl chloride resin composition according to claim 1, wherein the butadiene rubber has an average particle diameter of 0.15 to 0.3 μm.

5. A polyvinyl chloride resin composition according to claim 1, wherein a monomer mixture comprising 6 to 34 parts by weight of methyl methacrylate and 0.5 to 4 parts by weight of an alkyl acrylate having 1 to 8 carbon atoms in the alkyl group, per 100 parts by weight of the butadiene rubber, is subjected to the first-stage graft polymerization, wherein the amount of the alkyl acrylate is 5 to 40% by weight based on the total amount of the alkyl acrylate and methyl methacrylate.

6. A polyvinyl chloride resin composition according to claim 1, wherein 16 to 93 parts by weight of styrene, per 100 parts by weight of the butadiene rubber, is subjected to the second-stage graft polymerization.

7. A polyvinyl chloride resin composition according to claim 1, wherein a monomer mixture comprising 8 to 50 parts by weight of methyl methacrylate and 1 to 12 parts by weight of an alkyl acrylate having 1 to 8 carbon atoms in the alkyl group, per 100 parts by weight of the butadiene rubber, is subjected to the third-stage graft polymerization, wherein the amount of the alkyl acrylate is 5 to 20% by weight based on the total weight of the alkyl acrylate and methyl methacrylate.

* * * * *

UNITED STATES PATENT AND TRADEMARK OFFICE
CERTIFICATE OF CORRECTION

PATENT NO. : 5,043,386

DATED : August 27, 1991

INVENTOR(S) : Kazuo Kishida et al.

It is certified that error appears in the above-identified patent and that said Letters Patent is hereby corrected as shown below:

On the title page, item [54] and col. 1, line 1, the title is incorrect, should be --POLYVINYL CHLORIDE RESIN COMPOSITION--.

Signed and Sealed this

Second Day of March, 1993

Attest:

STEPHEN G. KUNIN

Attesting Officer

Acting Commissioner of Patents and Trademarks